US005788887A

United States Patent [19]
Swanson

[11] Patent Number: 5,788,887
[45] Date of Patent: Aug. 4, 1998

[54] ANTIMONY DOPED TIN OXIDE ELECTROCONDUCTIVE POWDER

[75] Inventor: Donald Keith Swanson, Wilmington, Del.

[73] Assignee: E. I. du Pont de Nemours and Company, Wilmington, Del.

[21] Appl. No.: 709,561

[22] Filed: Nov. 1, 1996

[51] Int. Cl.$^6$ ............................................. H01B 1/08
[52] U.S. Cl. ............................ 252/520.1; 252/519.1; 428/402
[58] Field of Search ...................... 252/518, 520.1, 252/519.1; 428/402; 423/92, 87, 593, 617, 618

[56] References Cited

U.S. PATENT DOCUMENTS

| | | | |
|---|---|---|---|
| 3,367,803 | 2/1968 | Loch | 136/238 |
| 4,246,143 | 1/1981 | Sonoda et al. | 252/518 |
| 4,373,013 | 2/1983 | Yoshizumi | 428/570 |
| 4,431,764 | 2/1984 | Yoshisumi | 524/409 |
| 4,452,830 | 6/1984 | Yoshizumi | 427/215 |
| 4,614,669 | 9/1986 | Yannopoulos | 427/87 |
| 4,655,966 | 4/1987 | Guillaumon et al. | 252/518 |
| 4,680,225 | 7/1987 | Ogawa et al. | 428/323 |
| 4,775,412 | 10/1988 | Nishikura et al. | 75/0.5 |
| 4,803,144 | 2/1989 | Hosoi | 430/106.6 |
| 5,051,209 | 9/1991 | Mirabeau et al. | 252/518 |
| 5,071,676 | 12/1991 | Jacobson | 427/214 |
| 5,104,583 | 4/1992 | Richardson | 252/518 |
| 5,192,613 | 3/1993 | Work, III et al. | 428/363 |
| 5,236,737 | 8/1993 | Linton | 427/126.3 |
| 5,281,365 | 1/1994 | Sohn et al. | 252/520 |
| 5,292,551 | 3/1994 | Jacobson | 427/215 |
| 5,326,633 | 7/1994 | Clough et al. | 428/288 |
| 5,330,833 | 7/1994 | Yamashita et al. | 428/364 |
| 5,476,613 | 12/1995 | Jacobson | 252/518 |
| 5,484,694 | 1/1996 | Lelental et al. | 430/530 |
| 5,626,975 | 5/1997 | Swank | 428/701 |
| 5,705,098 | 1/1998 | Okuda et al. | 252/518 |
| 5,716,553 | 2/1998 | Bergmann et al. | 252/518 |

FOREIGN PATENT DOCUMENTS

| | | |
|---|---|---|
| 0 025 583 | 3/1981 | European Pat. Off. . |
| 0 147 213 | 7/1985 | European Pat. Off. . |
| 0 359 569 | 3/1990 | European Pat. Off. . |
| 60-49140 | 10/1985 | Japan . |
| 61-3291 | 1/1986 | Japan . |
| 61-286224 | 12/1986 | Japan . |
| 1-14174 | 3/1989 | Japan . |
| 2077473 | 3/1990 | Japan . |
| 4-55320 | 2/1992 | Japan . |
| 5-279042 | 10/1993 | Japan . |
| 2 025915 | 1/1980 | United Kingdom . |
| 2188313 | 9/1987 | United Kingdom . |

OTHER PUBLICATIONS

Tsunashima et al., "Preparation and properties of antimony-doped $SNO_2$ films by thermal decomposition of tin 2-ethylhexanoate," *Journal of Materials Science 21* (1986).

Hermann et al., "Influence of Calcination on the Electrical Properties of Tin-Antimony Mixed Oxide Catalysts," *React. Kinet. Catal. Lett.*, vol. 12, No. 1, 51-56 (1979).

Paria et al., "Electrical conductivity and defect structure of polycrystalline tin dioxide doped with antomony oxide," *Journal of Materials Science* (1982).

Jarzebski et al., "Physical Properities of $SnO_2$ Materials—Preparation and Defect Structure," *Journal of the Electrochemical Society* (Jul. 1976).

Jarzebski et al., "Physical Properties of $SnO_2$ Materials—Electrical Properties," *Journal of the Electrochemical Society* (Sep. 1976).

Jarzebski et al., "Physical Properties of $SnO_2$ Materials–Optical Properties," *Journal of the Electrochemical Society* (Oct. 1976).

*Primary Examiner*—Douglas J. McGinty

[57] ABSTRACT

Antimony doped tin oxide powder having an open pore structure wherein the pore volume is at least 0.005 cc/g for any mean pore diameter within the range of 0.1 to 8 micrometers is disclosed.

4 Claims, 10 Drawing Sheets

ANTIMONY DOPED TIN OXIDE ELECTROCONDUCTIVE POWDER

FIELD OF THE INVENTION

The present invention relates to antimony doped in oxide electroconductive powders having an open pore structure.

BACKGROUND OF THE INVENTION

Antistatic properties are important in all steps of the manufacture, shipment and final use-assembly of sensitive electronic parts, such as computer chips, because these parts need to be protected from electrostatic discharge. This requires that all work surfaces and objects which come in contact with these parts be made electrically conductive to prevent build-up of electrostatic charges, i.e., electrostatic charge build-up and its subsequent rapid discharge can damage electronic parts. As a consequence, manufacturers of such parts employ electroconductive coatings for floors, walls, and furniture in the "clean rooms" where electronic parts are produced. Plastic shipping containers for shipment of electronic parts need to have conductive coatings to prevent electrostatic discharge damage of the parts during shipment.

An additional important requirement for such coatings in electronic packaging is to minimize the presence of chloride and other anions. It is desirable for the coatings to avoid emitting or exuding significant amounts of anions such as chloride, fluoride, sulfate, and others because they can be highly corrosive and detrimental to delicate electronic parts shipped in plastic containers.

Electroconductive coatings are also used in dielectric printing processes that use conductively coated transparent film or paper as a substrate. Thin films or coatings containing electroconductive powders can be used in polymer films, magnetic recording tapes, on work surfaces, and in paints to impart electroconductive properties.

Some antimony doped tin oxide electroconductive powders and processes for their preparation are well known in the art. However, there is a need for manufacturing electroconductive powders in a more efficient economical manner. The present invention provides an electroconductive powder having the conductive properties required for multiple coating uses, and also having an open pore structure which permits more efficient manufacture of the powder and more efficient removal of anions from the powder.

SUMMARY OF THE INVENTION

The present invention comprises an electroconductive powder comprising antimony doped tin oxide containing from about 0.25 to about 20 weight percent antimony, said powder having a pore volume of at least 0.005 cc/g for any mean pore diameter size within a range of from about 0.1 to about 8 micrometers. When calcined at the appropriate temperature, these powders have dry powder resistivities of 100 ohm.cm or less when measured at a pressure of $27.6 \times 10^6$ Pa (4,000 psi).

DETAILED DESCRIPTION

The present invention comprises an electroconductive antimony doped tin oxide powder having an open pore structure in the pore diameter size range of from about 0.1 to about 8 micrometers, and a pore volume within this range of at least 0.005 cc/g. This powder is prepared by a process that involves addition of tin and antimony chlorides to a concentrated base in a manner that affects the nature of the particle nucleation and precipitation, and therefore, the physical characteristics of the resultant powder.

By "conventional" process as used herein is meant a solution precipitation process for preparing electroconductive antimony doped tin oxide powders in which an aqueous basic solution and a mixture of acidic antimony solution and tin salt solution are added simultaneously to a vessel containing water while maintaining the pH within a particular range.

By "regular" addition process as used herein is meant a solution precipitation process for preparing electroconductive antimony doped tin oxide powders involving addition of a concentrated base to a solution of antimony and tin salts, typically an acidic solution of antimony and tin chlorides. The pH is changed from very acidic to less acidic.

By "reverse" process as used herein is meant a solution precipitation process for preparing antimony doped tin oxide electroconductive powders characterized by addition of a solution of antimony and tin salts, typically an acidic solution of the metal chlorides, to a concentrated base. The pH is changed from very basic to acidic.

By "open pore structure" as used herein is meant having a pore volume of 0.005 cc/g or greater for any pore diameter within the pore diameter size range of from about 0.1 to about 8 micrometers.

The present invention provides an antimony doped tin oxide electroconductive powder having porosity characteristics that provide the particles of the powder with a structure that allows more efficient washing with respect to time and amount of deionized washwater needed to remove residual salts from the powder generated by the acid base neutralization reaction. The porosity characteristics of this electroconductive powder provide a reduction in overall manufacturing time and costs, and a reduction in the volume of waste water stream due to the more efficient washing step relative to those associated with precipitation processes of the prior art to manufacture antimony doped tin oxide electroconductive powders.

The electroconductive powders of this invention have low resistivity and can be used in numerous applications as a component of coating mixtures to provide antistatic properties and/or electrical conductivity to a wide variety of substrates.

The electroconductive powders of the present invention are comprised of tin oxide doped with antimony. A practical range of antimony concentration is 0.25–20% by weight on an elemental basis. This range provides a conductive powder that ranges from light blue or green to dark blue in color.

The amount of antimony doped into a tin oxide powder affects the color, crystallite size, surface area, and conductivity of the powder for a given calcination temperature. For example, for a given calcination temperature, powders containing 10% by weight antimony are darker blue in color, have smaller crystallites, higher surface area, and are usually more conductive than powders containing 0.5% by weight antimony. Increasing the calcination temperature of a powder normally results in increased crystallite size, lower surface area, and higher conductivity for a given antimony concentration. These trends are general and occur over ranges in antimony concentration in tin oxide powders of approximately 0.1 to 20% by weight and calcination temperatures between about 400° C. and about 900° C. Above about 20% by weight antimony, a powder is virtually saturated with antimony and additional antimony provides little to no benefit in increasing conductivity. At calcination temperatures below about 400° C., powders are usually poorly conducting and above about 900° C., the antimony begins to volatilize from the powder when calcined in air.

The dry powder electrical resistance is an important property of the compositions of the present invention. The electroconductivity of a powder is inversely related to the resistivity and it is desirable that the dry powder electrical resistance be as low as possible so that the powder is most effective when incorporated into electroconductive coatings and films. A calcined powder of the present invention is characterized by having a resistivity in the range of 0.1–100 ohm.cm when measured at a pressure of $27.6 \times 10^6$ Pa (4000 psi).

The powder particles of this invention form a porous network in their arrangement of crystallites which defines the structure of the particle aggregates, and therefore, the overall porosity and pore size distribution of the powders. The porous structure of the electroconductive powders of this invention provides aggregates of crystallites that appear bound together.

The powders of this invention have an open pore structure in the pore size range of 0.1 to 8 micrometers and a pore volume within this range of at least 0.005 cc/g. Preferably the powders of this invention have a pore volume of at least 0.01 cc/g for any pore diameter within the mean pore diameter size range of from about 0.1 to about 5 micrometers. In comparison, conventional powders, such as those prepared by "conventional" processes or "regular" addition processes, are observed to have essentially no pore structure in the pore size range of 0.1 to 8 micrometers. This is demonstrated by FIGS. 1 and Example 3.

To illustrate the unique microstructure of the powders of this invention, a comparison was made of the physical properties of two 10% by weight antimony doped tin oxide powders, one having been prepared according to a "conventional" addition process in which the maximum temperature reached during reaction was 90° C., and a second powder having been prepared according to the "reverse" addition process with a maximum reaction temperature of 95° C. in accordance with Example 3. Although the surface areas are essentially similar, the pore size distributions of these powders are very different as determined by mercury (Hg) intrusion data. Mercury porosimetry data are obtained by known methods. See H. M. Rootare, "A Review of Mercury Porosimetry" from Advanced Experimental Techniques in Powder Metallurgy, pp.225–252, Plenum Press, 1970. The differential volume (dv) was graphed against the mean pore diameter (in micrometers) for these two powders in FIG. 1. The pores observed above 10 micrometers in size are related to the packing of the powders in the instrument.

The pore sizes important to this invention occur between 0.1 and 8 micrometers and are attributed to the particle morphologies. The "conventional" addition process powder, represented by white squares on FIG. 1, exhibits a single large peak at a pore size of approximately 0.09 micrometers which is attributed to a closest packed array of spheres with an approximate diameter of 0.13 micrometers. This is analogous to what might be expected for a monodispersed powder of that size which was allowed to gravity settle in a fluid medium. The pore distribution for the powder of the present invention, represented by white triangles on FIG. 1, made using the "reverse" process is very different from the pore distribution of the conventional powder. The powders of the present invention show a broad pore distribution having a delta volume (dv) value of 0.005 cc/g or greater in the pore size range between about 0.1 and 8 micrometers. A typical pore volume averages from about 0.01 to about 0.03 cc/g. It is the pores in this size range that control how readily accessible the internal surface area of the powder is to washwater. More specifically, these pores control the rate of surface washing and ion exchange processes that are responsible for rapid and efficient removal of undesirable soluble ion species present in the product slurry.

Scanning electron micrographs (SEM) of the powders described above for FIG. 1, at two different magnifications corroborate the measurements of the Hg intrusion data. FIG. 2a and FIG. 2b are low and high magnification micrographs of the 10% by weight antimony doped tin oxide powder prepared by a "conventional" addition process. FIG. 2a shows a dense packing of the primary particles and FIG. 2b clearly shows the dense microstructure and the small pores that are formed in these dense aggregates that are on the order of about 0.1 micron in size, in good agreement with the Hg intrusion data. FIG. 2c and FIG. 2d are the corresponding scanning electron micrographs for the 10% by weight antimony doped tin oxide powder of this invention made using the "reverse" process. Both micrographs in FIG. 2c and FIG.

2d clearly show much larger pore sizes and broader pore distributions than for the "conventional" process powder. The powder of this invention has a "fluffy" appearance with pore sizes that are in good agreement with the 0.1 to 8 micron range determined from the Hg intrusion data.

Figure 3:
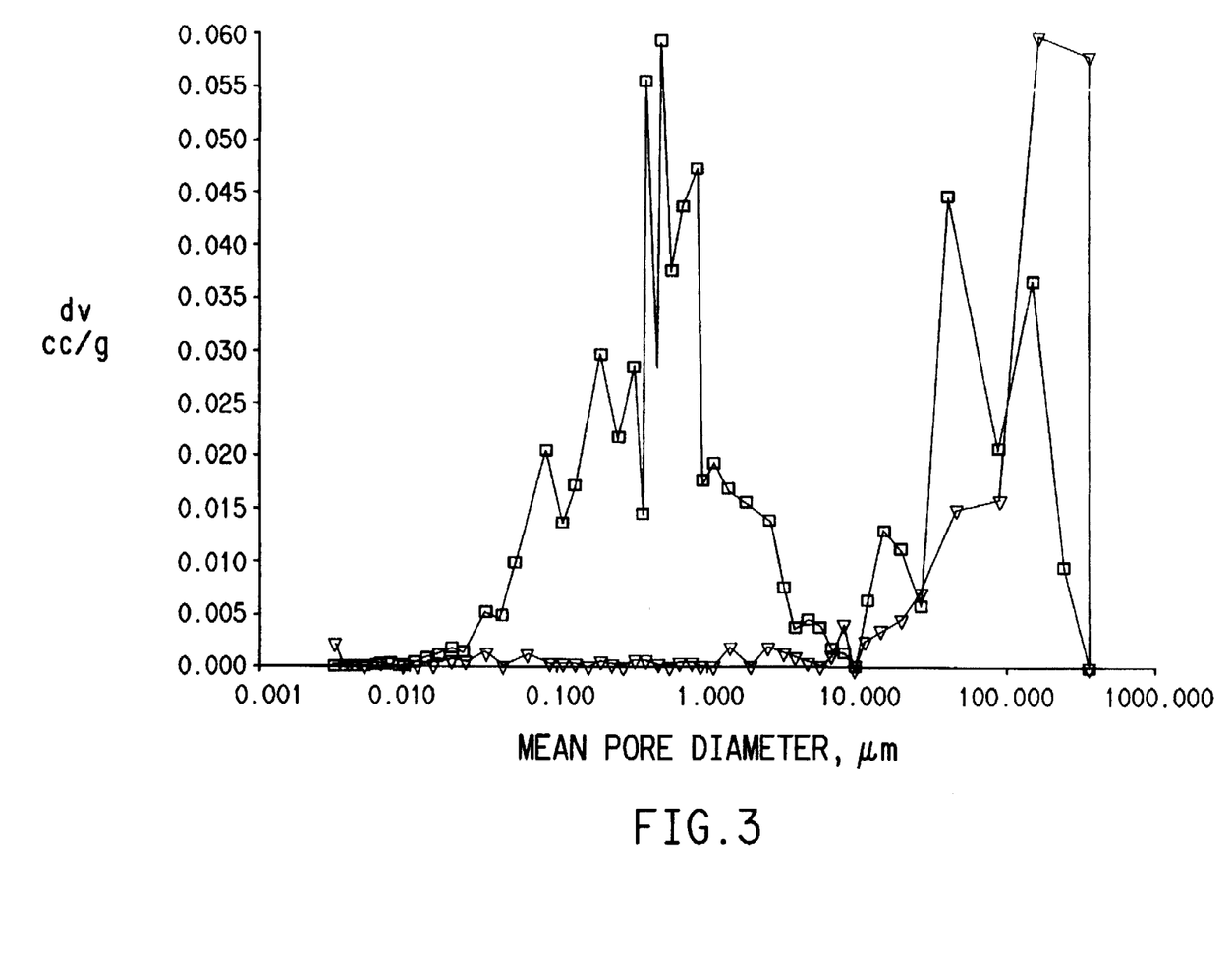
FIG. 3 is a graph of pore volume versus mean pore diameter for two electroconductive tin oxide powders doped with 1% by weight antimony. The white triangles represent a powder prepared using a "regular" addition process and the white squares represent the powder of the present invention of Example 1.

The open pore structure of the powders of the present invention were also illustrated for tin oxide powders containing 1% by weight antimony. FIG. 3 is a plot of the differential pore volume vs. the mean pore diameter for 1% by weight antimony doped tin oxide powders made using "regular" and "reverse" processes. The powder of the present invention is represented by white squares and that of the "regular process" is represented by white triangles. Again the powder of the present invention made using the "reverse" process has an open and broad pore distribution ranging from about 0.05 to 10 micrometers whereas the powder made from the "regular" process shows essentially no porosity in this size range.

Figure 4A:
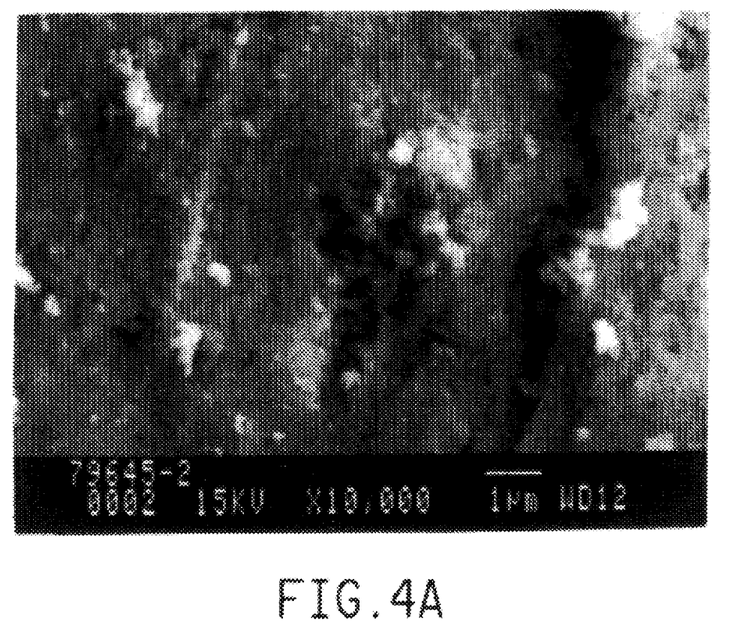
FIG. 4a and FIG. 4b are scanning electron micrographs at low and high magnification, respectively, of the tin oxide powder prepared by a "regular" addition process from FIG. 3.
Figure 4B:
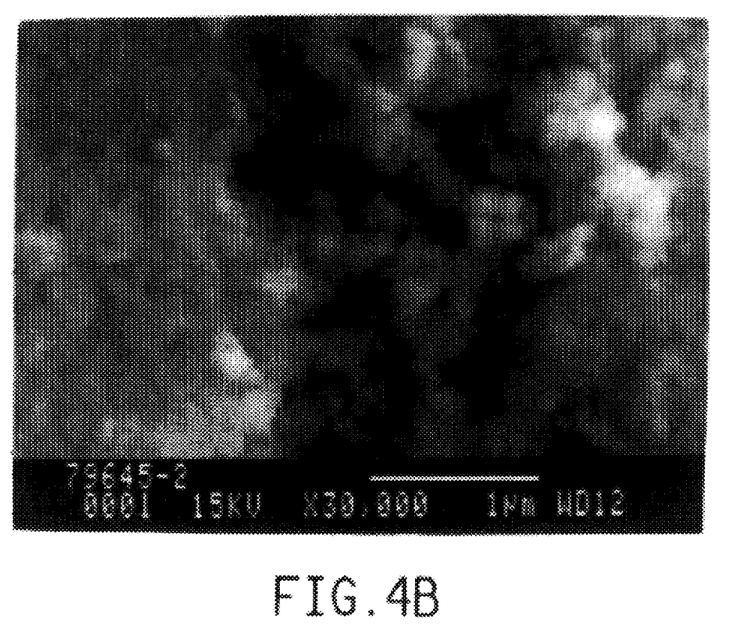
Figure 4C:
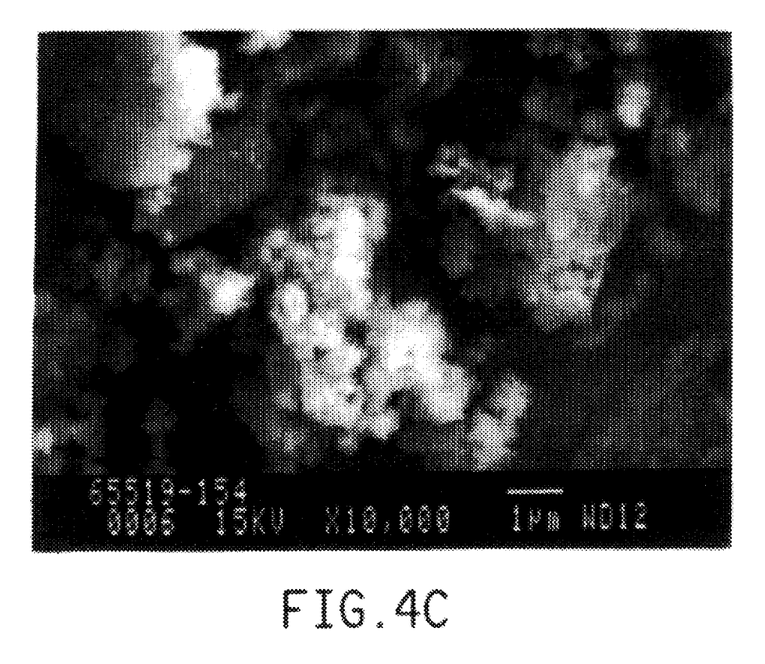
FIG. 4c and FIG. 4d are scanning electron micrographs at low and high magnification, respectively, of the powder of the present invention of Example 1 from FIG. 3.
Figure 4D:
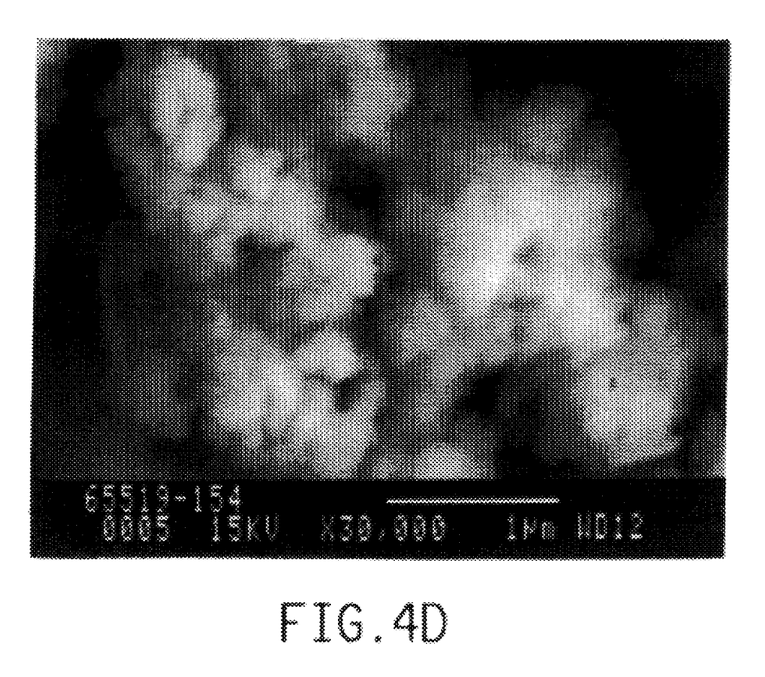

FIG. 4a and 4b are scanning electron micrographs at low and high magnification respectively, of a 1% by weight antimony doped tin oxide powder prepared by a "regular" addition process. FIG. 4c and FIG. 4d are scanning electron micrographs at low and high magnification, respectively, of a 1% by weight antimony doped tin oxide powder of the present invention made using a "reverse" process. The micrographs corroborate the observed differences in pore size and distribution as measured from Hg intrusion data.

Figure 5A:
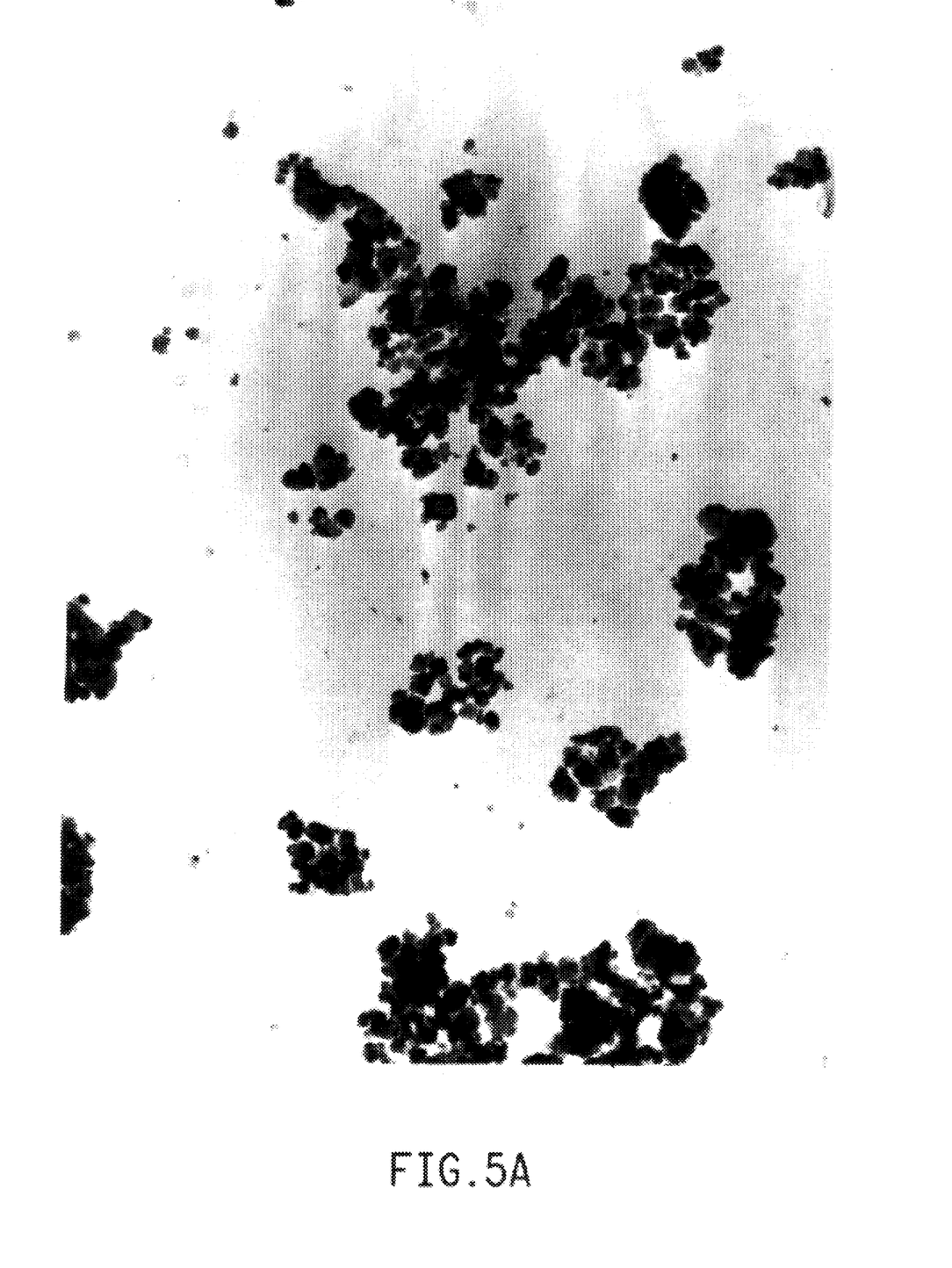
FIG. 5a is a transmission electron micrograph of the 1% by weight antimony doped tin oxide powder, prepared by a "regular" addition process, the same powder as in FIGS. 3, 4a and 4b.
Figure 5B:
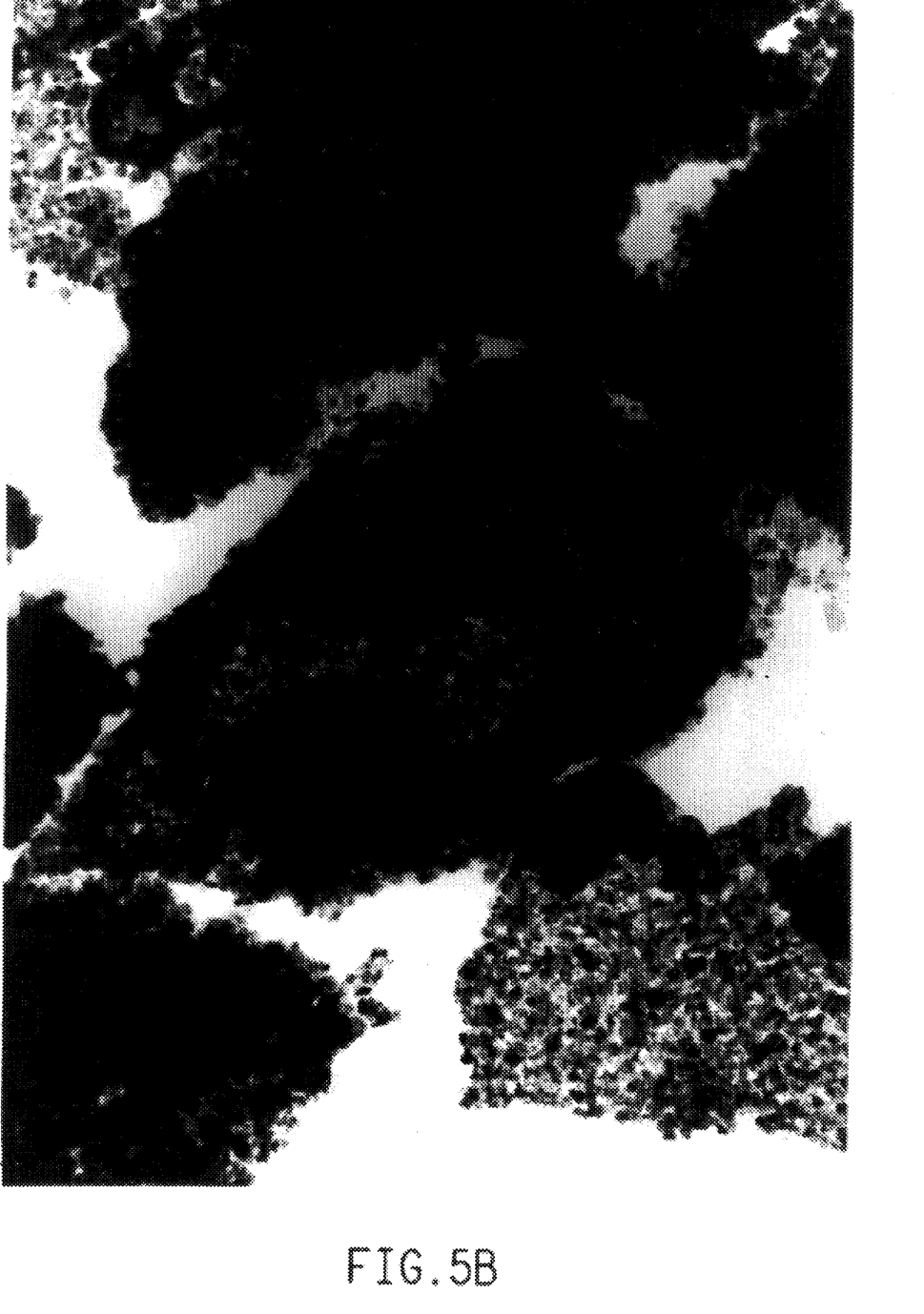
FIG. 5b is a transmission electron micrograph of the 1% by weight antimony doped tin oxide powder of the present invention of Example 1, the same powder as in FIGS. 3, 4c and 4d.

Transmission electron micrographs further illustrate the differences in particle microstructure for the powders of the present invention. For the two 1% by weight antimony doped tin oxide powders, FIG. 5a is a transmission electron micrograph of a powder prepared by a "regular" process showing mostly discrete crystallites of about 20 to 60 nm in size with some larger aggregates comprised of these smaller crystallites. The scale for FIG. 5a is 1 cm=74 nm. FIG. 5b is a transmission electron micrograph of the powder of the present invention showing primarily large coarse aggregates comprised of crystallites 20 to 60 nm in size that appear to be bound together giving this powder its unique microstructure and pore size distribution. The scale for FIG. 5b is 1 cm=95 nm.

The open pore structure of the powders of the present invention permits more efficient removal of residual salts or anions via washing with deionized water. A comparison of the wash data for a tin oxide powder doped with 1% antimony prepared by "regular" process and a tin oxide powder doped with 1% by weight antimony of the present invention showed improved wash efficiency for the powder of the present invention. It required approximately 68 hours using 50 liters of deionized water to achieve a washwater soluble ionic conductance of 83 micromhos (reciprocal ohms or microsiemens) for the powder of the "regular" process. It required only about 10 hours using 33 liters of deionized water to achieve a washwater soluble ionic conductance of 104 micromhos (microsiemens) for the powder of the present invention. The pronounced improvement in washing efficiency is attributed to the unique particle microstructure and pore size distribution of the powder of the present invention. Since the washing is typically conducted as part of the powder manufacturing process, the powders of the present invention are more efficient to manufacture.

The electroconductive powders of the present invention are prepared by a "reverse" addition process in which a solution of antimony and tin precursors is added to a concentrated base. An antimony containing tin oxide product is formed which is washed, dried and calcined to obtain the desired product.

Preparation of antimony doped tin oxide powders of the present invention containing 0.5–20% by weight antimony involves the following steps:

(1) preparing an acidic salt solution of 1% to 50% by weight antimony and an aqueous salt solution of 20% to 50% by weight of tin salt.
(2) combining the salt solutions to yield a mixture.
(3) precipitating the powder by adding the mixture to a concentrated base and maintaining the temperature at from about 50° C. to about 95° C. after initial heating of reaction and dilution, until a pH of from about 2 to about 4 is reached.

The solid powder product is then recovered by filtration, washed until the washwater has a conductance of about 100 micromhos (microsiemens) or less, and then dried and calcined.

The process used to prepare the powders of the present invention begins with the preparation of salt solutions of tin and antimony. The source is usually tetravalent tin salts. A solution of from about 20% to about 50% by weight tin is suitable. Preferred is a 50:50 by weight solution of $SnCl_4$ and water. Although chloride is preferred, other water soluble salts such as sulfate and nitrate may also be suitable for use herein.

The tin oxide is doped with antimony. An acidic salt solution of antimony is prepared. It is convenient to use the chloride salt, however, other water soluble salts may also be suitable. The concentration of the antimony salt solution is in the range of 1% to 50% by weight antimony. The preferred antimony salt solution is 20% by weight $SbCl_3$ and 80% by weight concentrated HCl.

The tin and antimony solutions are combined and mixed in a single vessel. This mixture is then added to a stirred basic solution. This basic solution is for example, aqueous sodium hydroxide, or possibly potassium hydroxide or ammonium hydroxide. The basic solution contains at least 20% by weight base. Preferably concentrated sodium hydroxide (50%) is used as the base.

The addition of the metal salt solution to the base is performed at temperatures from 20° to 100° C. It is preferred to begin the reaction at ambient temperature and allow the heats of reaction and dilution to increase the temperature to from about 50° C. to about 95° C. It is observed that after the run is approximately 75 to 90% complete that at temperatures less than about 50° C. the slurry typically becomes so viscous that it is necessary to add additional water so that the mixture can continue to be stirred throughout the addition of the remaining metal salt solution. While not wishing to be bound by theory, it is believed that the temperature of the slurry when it is observed to thicken dictates the pore structure obtained in the final powder.

The rate of addition of the metal salt solution can be varied. It is preferable to add the metal salt solution in stages, beginning the addition at a relatively slow rate to allow for the heat generated by the dilution of the concentrated base and the acid/base reaction to gradually increase the temperature to from about 50° C. to about 95° C. When the temperature no longer increases rapidly, the rate of addition of the metal salt solution is increased. Further increases in the addition rate can also be made, particularly as the temperature begins to decrease after reaching a maximum midway in the run. At temperatures less than about 50° C. the reaction mixture typically has thickened to pudding-like consistency and water must be added to regain proper mixing.

To precipitate the powder the metal salt solution is added to the base until a final pH of from about 2 to about 4 is reached. The final pH of the reaction mixture also has an effect on the washing performance and properties of the product powders with very high resistances. At a pH lower than about 2 the resistance may not change significantly, but the increased acidity results in the need to use more water and more time to wash out dissolvable salts and additional HCl from the product powder. At a pH above about 4, typically not all of the antimony precipitates.

The product powder of the present invention is collected by filtration, for example, by vacuum filtration, and is washed with deionized water until the conductance of the washwater is approximately 100 micromhos (microsiemens) or less. The product is then dried at 120° C. to 150° C. in an oven.

The dried powder is next calcined in air, at a temperature in the range of about 400° C. to about 900° C. for 30 minutes to 4 hours. The calcination temperature required for good powder conductivity in the product is dependent on the amount of antimony dopant used, with lower dopant levels typically requiring higher calcination temperatures to obtain similar conductivities as powders containing high dopant levels.

In the process of preparing antimony doped electroconductive powders, it is typical to have an extensive washing step to remove undesirable ions from the powder that result from the formation of salts, e.g., NaCl, during the acid-base neutralization which occurs in the process. If such salts are left in the powder, they can ultimately cause problems in end use applications such as electrostatic dissipative packaging and clean room electrostatic wall coatings.

The washing step of the process to prepare antimony doped tin oxide electroconductive powders of this invention is highly efficient in terms of both time and quantity of water required. It is generally desirable to reduce the content of dissolved ions present in the mother liquor slurry to a soluble ionic conductance level of about 100 micromhos (microsiemens) or less. In preparing the powders of the present invention, the washing step is at least two times faster than the washing step for a conventionally prepared antimony-doped electroconductive powder. Further, the washing step for the powders of the present invention generally requires 1.5 to 3 times less water to reduce the content of dissolved ions to a washwater soluble ionic conductance of about 100 micromhos or less. The particle microstructure results in a broad pore size distribution in the range of about 0.1 to 8 micrometers which is responsible for the excellent wash performance exhibited by the powders of this invention.

The electroconductive tin oxide powders of the present invention prepared by the process described herein contain 0.25-20 wt % antimony and have an electrical resistance of the dry powder of less than 100 ohm.cm when measured at a pressure of $27.6 \times 10^6$ Pa (4000 psi). Preferably its electrical resistance is less than 20 ohm.cm when measured at a pressure of $27.6 \times 10^6$ Pa (4000 psi). Generally, the lower the relative resistance of a dry powder, the higher the conductance in an end-use application. However, many other factors, such as the ability to form an interconnecting network in the end-use carrier matrix or binder system, may also affect end-use conductance.

The electroconductive tin oxide powders of the present invention have conductive properties required for multiple uses. They are useful in conductive coatings for floors, walls, and furniture in "clean rooms" where electronic parts sensitive to electrostatic discharge are produced. The powders of the present invention are also useful in coatings for shipping containers of such electronic parts. Other examples of uses for the powders of the present invention are in dielectric printing processes, polymer films, magnetic recording tapes and paints.

The electroconductive material of the present invention and its method of preparation are illustrated in more detail in the following examples. Unless stated to the contrary, composition is on a weight percentage basis.

EXAMPLES

Example 1

A 4 liter glass beaker was charged with 917 g of 50 wt % aqueous NaOH solution which was stirred with a teflon paddle at about 100 rpm. To a 2 liter glass beaker were charged 47 g of an antimony solution containing 80% by weight of concentrated HCl and 20% by weight of $SbCl_3$ and 1556 g of a tin solution containing 50% $SnCl_4$ and 50% water by weight. This solution of antimony and tin chlorides was then stirred.

The metal chloride solution was pumped from a balance into the 4 liter glass beaker containing the base solution at a rate of about 6 ml/min. Temperature was allowed to increase from about 25° C. to 75° C. as the metal chloride solution was added to the base. After pumping about 300 g of the metal chloride solution, the rate of pumping was increased to about 10 ml/min., and then after pumping an additional 50 g, the rate was increased to 25 ml/min. The metal chloride solution was added to the base until 1480 g total of solution had been added, after which the reaction was stopped. The final pH of the slurry was about 3.

The slurry was filtered and washed with deionized water to a conductance of 104 micromhos (microsiemens), as measured by a conductance probe, which required 32.5 liters of deionized water and approximately 10 hours. For this experiment a "qualitative", #1, 27 cm diameter filter paper made by Whatman International Ltd. was used.

The wet filter cake was oven dried at 120° C., then calcined in air at 600° C. for two hours. The product powder was mechanically milled in a small laboratory blender to break up the larger agglomerates. The powder contained a nominal 1.1 wt % antimony and had a dry powder resistivity of 17 ohm.cm when measured at a pressure of $27.6 \times 10^6$ Pa (4,000 psi). The single point B.E.T. surface area was 18.4 m2/g, determined by the method of Branauer, Emmett and Teller, *J. Amer. Chem. Soc.* Vol. 60, p 309 (1938). The crystallite size was 17.8 nm (178 Angstroms) based on standard X-ray peak line broadening. The bulk density was 1.03 grams/ml and the particle size distribution was d16=0.5, d50=1.2, and d84=5.4 micrometers.

The porosity data for this material, scanning electron micrographs, and transmission electron micrographs are presented in FIGS. 3 (white squares), 4c, 4d, and 5b respectively.

The resistivity of the antimony doped tin oxide electroconductive powder was determined by a powder resistance test. The powder resistance test was performed with a cylindrical cell and a Carver laboratory press as detailed in U.S. Pat. No. 5,236,737 herein incorporated by reference. The cell was constructed with brass electrodes at the top and bottom, that fit snugly inside a cylindrical piece of plastic having an inner diameter of about 3 centimeters. Copper leads attached to the brass electrodes were connected to an ohm meter. With the bottom electrode in position, a sample of the electroconductive powder as prepared above, was introduced into the plastic cylinder and the top electrode is placed in position above the powder. The height of the powder was about 2 cm before any pressure is exerted on it. Using a Carver laboratory press, the powder sample was compressed between the upper face of the bottom electrode and the lower face of the top electrode. The height and electrical resistance of the powder were then measured, the latter with an ohm meter. The measurement of the height and resistance were taken at a compression of $27.6 \times 10^6$ Pa (4000 psi).

The value of the powder resistance at the compression used was obtained by the following: Resistivity, r=(Resistance×Area)/Height Resistance was measured in ohms. Area was the area of the cylinder cross-section in square centimeters. Height was the length of the powder column between the top and bottom electrodes in centimeters.

Comparative Example A

To a 2 liter glass beaker were charged 44 g of an antimony solution containing 80% by weight of concentrated HCl and 20% by weight of $SbCl_3$ and 1436.6 g of a tin solution containing 50% $SnCl_4$ and 50% water by weight. This solution was transferred to a 4 liter beaker equipped with a paddle and stirred at 150 rpm.

A 50% NaOH solution was pumped from a balance into the 4 liter beaker containing the metal chloride solution at a rate of about 20 ml/min. Temperature was observed to increase from about 27° to 81° C. after 340 ml of the base had been added at which time the pump rate was changed to 10 ml/min. A maximum temperature of 90° C. was reached after 600 ml total of the base had been added to the metal chlorides. The slurry slowly cooled with further addition of base. After addition of 820 g total of base, 500 ml of deionized water were added to lower viscosity and to improve agitation. After addition of 840 g total of base, 500 ml more of deionized water were added. The remaining base was then added to the slurry until 917 grams of 50% NaOH had been added. The final temperature was 59° C. and final pH was 3.

The slurry was filtered and washed to a conductance of 83 micromhos (microsiemens) which required 50 liters of deionized water and approximately 68 hours. The wet filter cake was dried in an oven at 120° C. and then calcined in air at 600° C. for two hours. The product powder was mechanically milled in a small laboratory blender to break up any large agglomerates. The powder contained nominally 1.1% by weight antimony with an average particle size of about 129 micrometers and a dry powder resistivity of 7 ohm.cm when measured at a pressure of $27.6 \times 10^6$ PA (4,000 psi). The crystallite size was 213 Angstroms and the single point BET surface area was 18.5 m2/g. The surface area and resistivity were determined as in Example 1.

The porosity data for this material is presented in FIG. 3 denoted by white triangles. The volume of pores in the diameter range of 0.1 to 8 micrometers was close to zero in contrast to the powder of Example 1 denoted as white squares on FIG. 3. Scanning electron micrographs of the powder of comparative Example A at low and high magnification is presented in FIG. 4a and FIG. 4b respectively. These showed a dense packing and microstructure in comparison with FIG. 4c and FIG. 4d of the powder of Example 1.

A transmission electron micrograph of the powder of comparative Example A is show in FIG. 5a. This showed mostly discrete crystallites or aggregates thereof. In comparison FIG. 5b of the powder of Example 1 showed large coarse aggregates.

Example 2

The effect of temperature on the pore structure of the powder was studied using the "reverse" process. A set of four experiments were conducted as in Example 1 using the reverse process with a final pH of 3 to make an antimony doped tin oxide powder containing a nominal 1% by weight of antimony. The maximum temperature reached for each run, which occurred after about 25% of the metal chloride solution had been added, and the temperature at which the reaction slurry was observed to thicken, which occurred after about 85–90% of the metal chloride solution had been added, are given below in Table 1. In addition, the single point surface area and bulk density of the oven dried powders, and the crystallite size and dry powder resistivity of these powders after being calcined for 2 hours at 750° C. are also shown. The surface area and resistivity were determined as in Example 1.

TABLE 1

| Sample | T[a] (max) °C. | T (thicken) °C. | Size[b] nm | SA[c] (m2/g) | BD[d] (g/cc) | DPR[e] (ohm.cm) |
|---|---|---|---|---|---|---|
| A | 90° C. | 75° C. | 28.7 | 134 | 1.1 | 1.2 |
| B | 70° C. | 55° C. | 31.9 | 178 | 1.0 | 1.8 |
| C | 50° C. | 38° C. | 33.9 | 215 | 2.2 | 0.9 |
| D | 30° C. | 19° C. | 36.2 | 208 | 2.1 | 1.1 |

Figure 6:
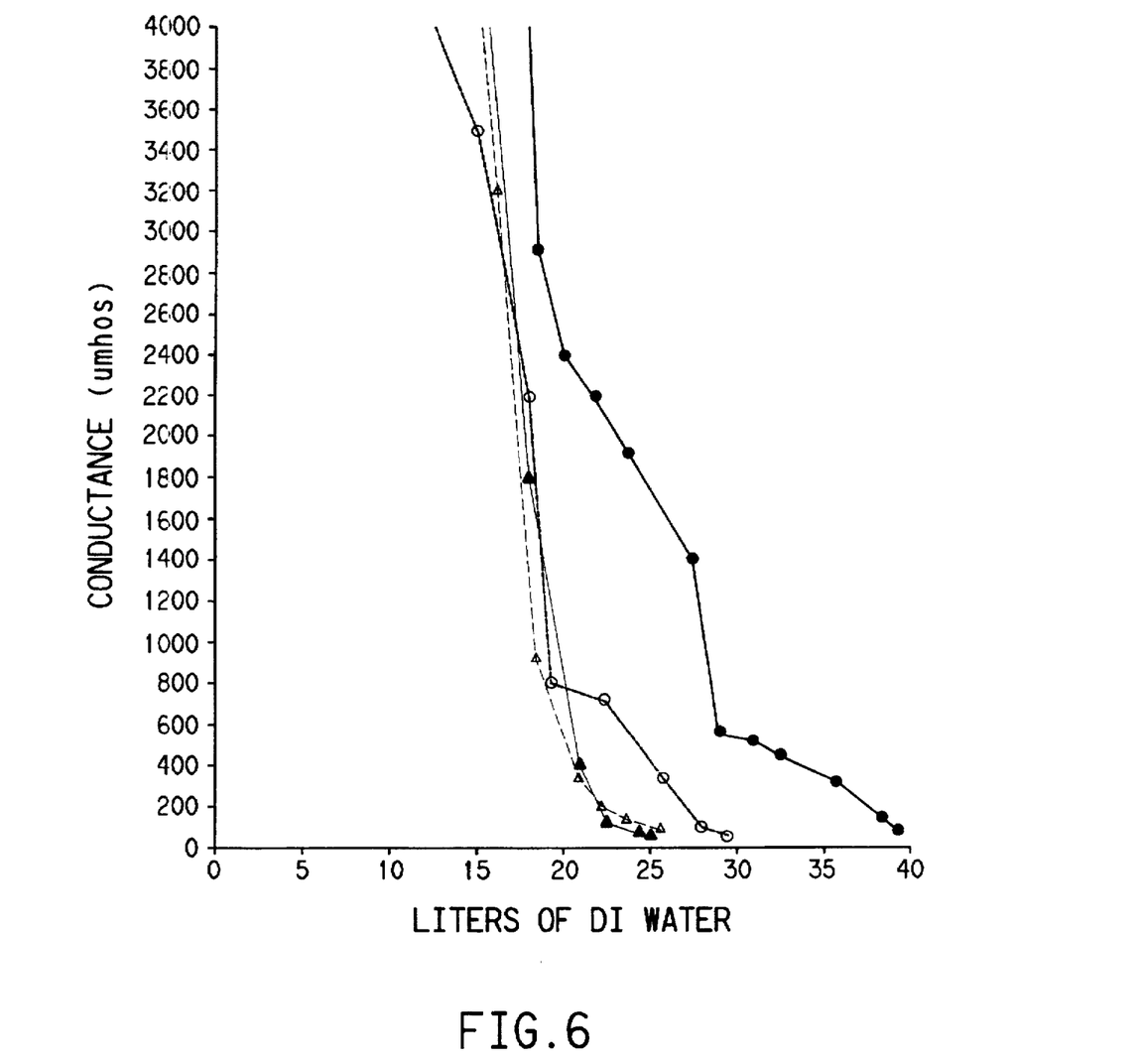
FIG. 6 is a graph of soluble ionic conductance of washwater versus liters of washwater for Samples A–D of Example 2 in which the four samples were processed at four different maximum reaction temperatures. Sample A is denoted by black triangles. Sample B by white triangles, Sample C by white circles and Sample D by black circles.

[a]T = temperature
[b]Size = Crystallite Size after calcination
[c]SA = Single Point Surface Area before calcination
[d]BD = Bulk Density, before calcination
[e]DPR = Dry Powder Resistivity, after calcination FIG. 6 shows the wash performance as a graph of soluble ionic conductance versus liters of deionized washwater used for the four samples from Example 2 starting at a washwater conductance of about 4000 micromhos (microsiemens) until the washing was complete. Sample A is denoted as black triangles, Sample B as white triangles, Sample C as white circles, and Sample D as black circles. Table 2 lists the maximum reaction temperature; time to complete the washing; and the amount of deionized water in liters needed to get to a conductance endpoint of less than 100 micromhos (microsiemens) in the washwater. The wash performance curves for Samples A and B are very similar. However, the wash performance curve for Sample C shows washing is less efficient requiring slightly more water and significantly more time to achieve the desired wash endpoint. Sample D further illustrates the detrimental effect of lower synthesis (reaction) temperature on wash performance. Sample D required about 7 times longer and required approximately 60% more water to achieve the desired wash endpoint than Samples A and B. In addition to the less efficient wash performance of Samples C and D, additional water had to be added to the slurry during the reaction to maintain proper mixing, which significantly reduced the volumetric efficiency of the process.

TABLE 2

Figure 7:
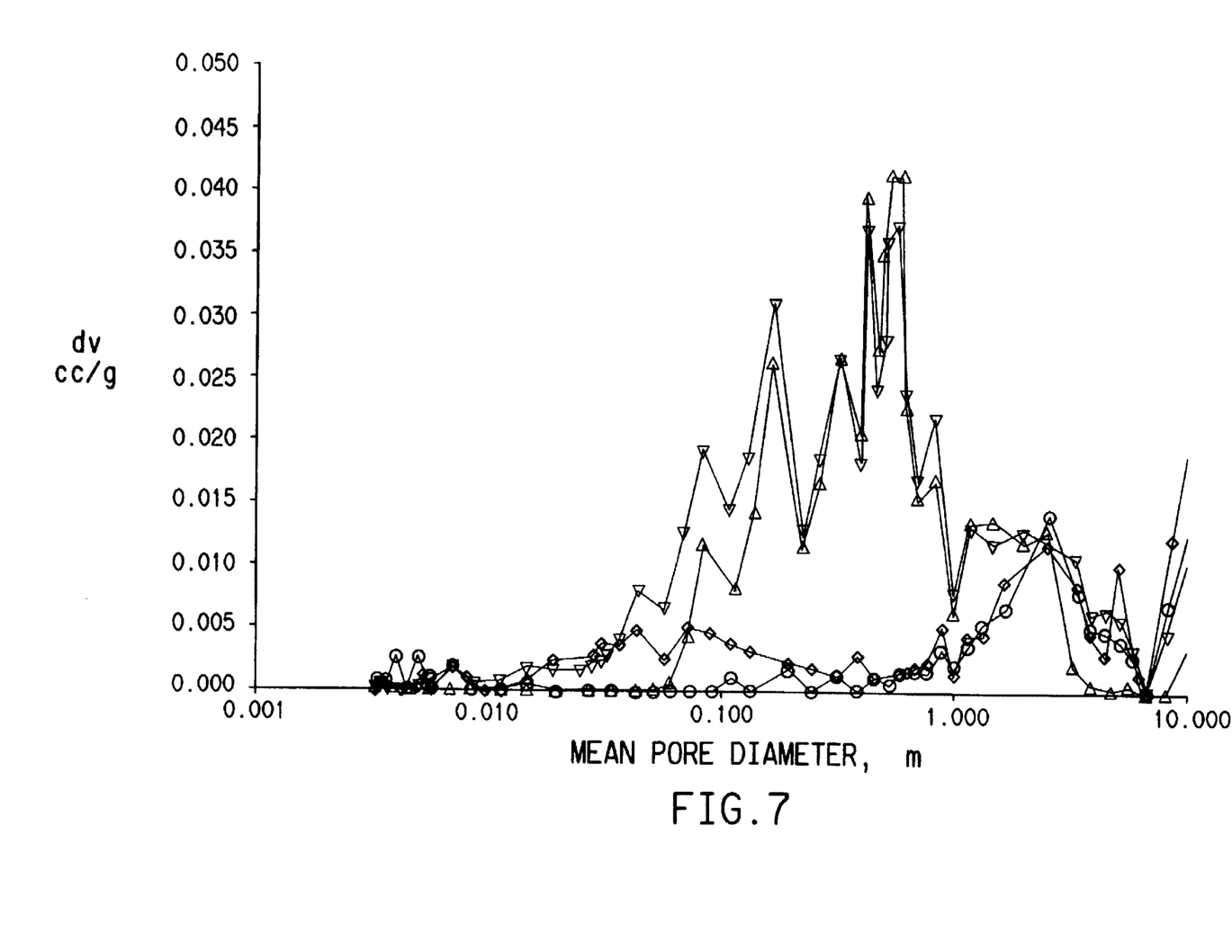
FIG. 7 is a graph of pore volume versus mean pore diameter for Samples A–D of Example 2 processed at four different maximum reaction temperatures. Sample A is denoted by white triangles pointing to the top of the Figure, Sample B by white triangles pointing to the bottom of the Figure, Sample C is denoted by white diamonds, and Sample D is denoted by white circles.

| Sample | FIG. 7 Symbol | Temperature (Max), °C. | Wash Time, hrs. | Wash Water Volume, L |
|---|---|---|---|---|
| A | △ | 90 | 4.5 | 25 |
| B | ▽ | 70 | 4.5 | 25 |

TABLE 2-continued

| Sample | FIG. 7 Symbol | Temperature (Max), °C. | Wash Time, hrs. | Wash Water Volume, L |
|---|---|---|---|---|
| C | ◇ | 50 | 20 | 29 |
| D | ○ | 30 | 32 | 40 |

The correlation of wash performance and pore structure for each of the powder Samples A–D was studied. FIG. 7 shows a graph of the incremental differential pore volume (dv) in cc/g versus the mean pore diameter for each of the four Samples A–D of Example 2. The data clearly show an open pore system in the pore size range of about 0.1 to 8 micrometers which was present in Samples A and B but lacking in Samples C and D. Sample C showed slightly more pore volume over that pore size range than did Sample D. It is believed that it is the open pore system in the pore size range of about 0.1 to 8 micrometers which is responsible for the improved washing performance of these powders. The "reverse" process run at the higher temperatures, e.g., at temperatures greater than 50° C., yielded powders having the most efficient wash performance characteristics and gave the highest volumetric efficiency.

Example 3

A 4 liter glass beaker was charged with 1000 g of a 50 wt % aqueous NaOH solution with stirring. To a 2 liter glass beaker were charged 37.9 g of an antimony solution containing 80% by weight of concentrated HCl and 20% by weight of $SbCl_3$ and 1400 g of a tin solution containing 50% $SnCl_4$ and 50% water by weight. The solutions of antimony and tin chlorides were stirred. The metal chloride solution was pumped into the beaker containing the base solution as in Example 1 with a temperature increase to a maximum of 95° C. to a final pH of 4.0. The resulting slurry was filtered and washed as in Example 1. The wet filter cake was dried at 120° C. and calcined at 600° C. for 2 hours. The product powder was mechanically milled. The powder contained about 10% by weight antimony and had a dry powder resistivity of 1.4 ohm.cm when measured at a pressure of $27.6 \times 10^6$ Pa (4000 psi) determined as in Example 1. The B.E.T. surface area of the uncalcined powder was 146 $m^2/g$ as determined in Example 1.

Figure 1:
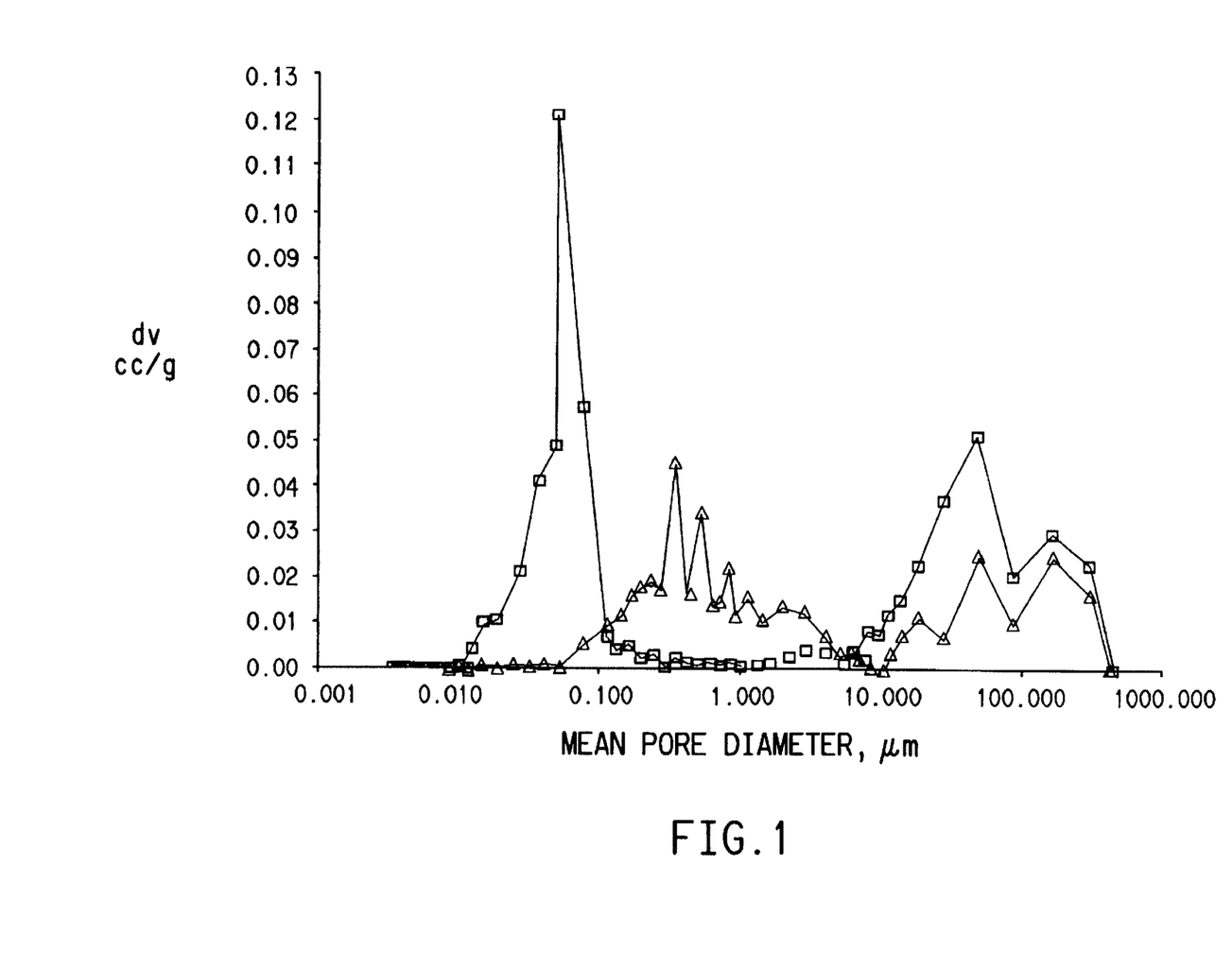
FIG. 1 is a graph of pore volume versus mean pore diameter for two electroconductive tin oxide powders doped with 10% by weight antimony. The white squares represent a conventionally prepared commercially available powder and the white triangles represent the powder of the present invention of Example 3.
Figure 2A:
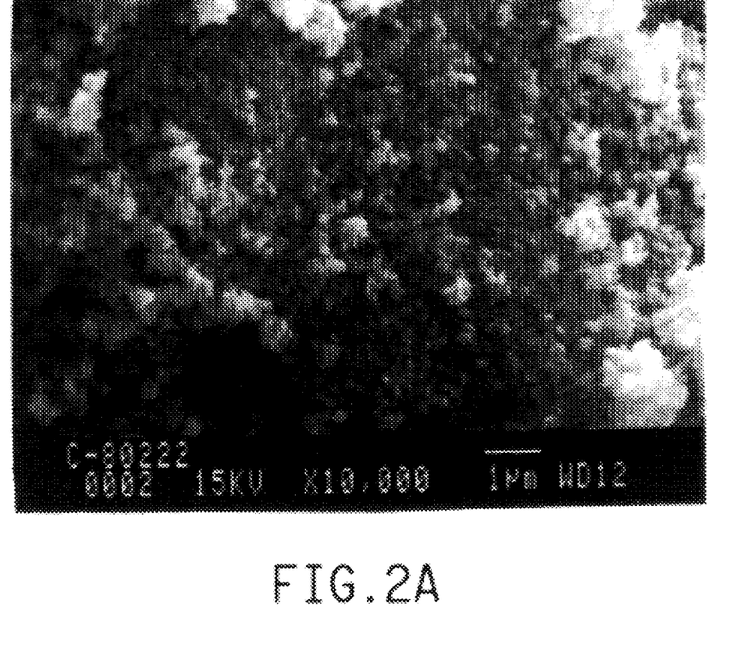
FIG. 2a and FIG. 2b are scanning electron micrographs at low and high magnification, respectively, of the conventionally prepared powder from FIG. 1.
Figure 2B:
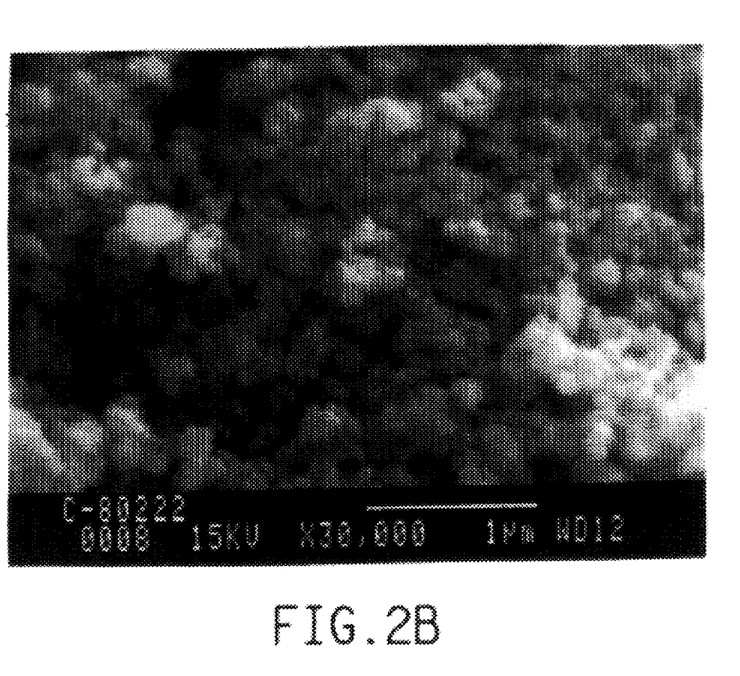
Figure 2C:
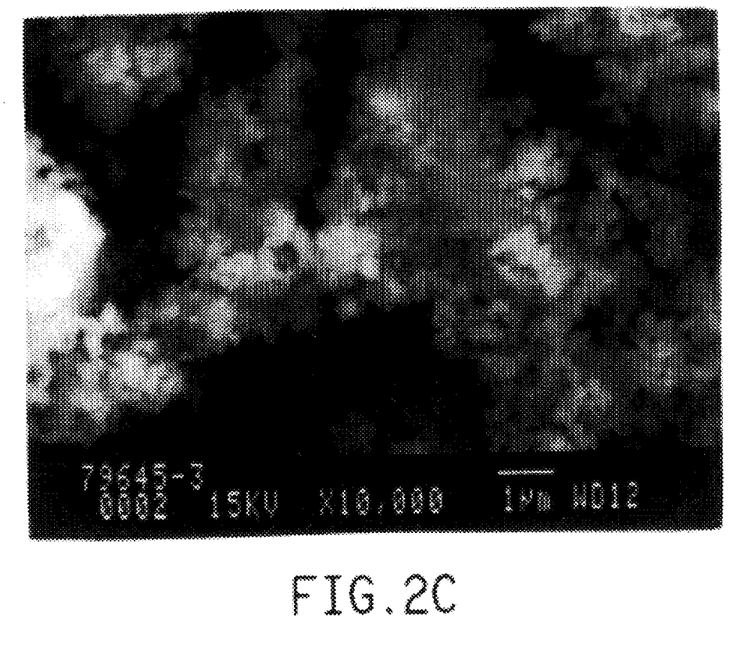
FIG. 2c and FIG. 2d are scanning electron micrographs at low and high magnification, respectively, of the powder of the present invention of Example 3 from FIG. 1.
Figure 2D:
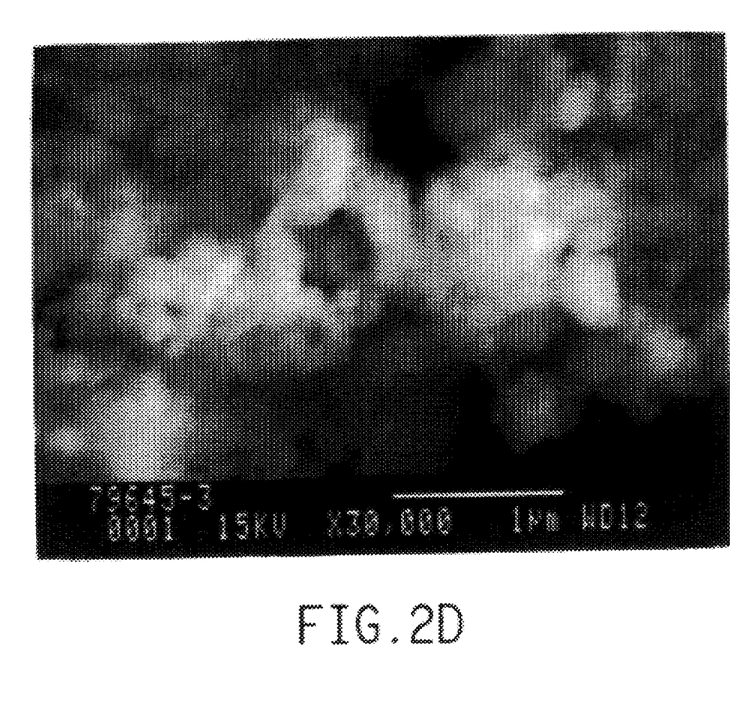

The porosity data for this powder is denoted in FIG. 1 as white triangles and shows a pore volume of 0.005 or greater, typically 0.02, in the pore size range between about 0.1 and 5 micrometers. This was compared to a commercial powder, ZELEC 3010 XC, available from E. I. du Pont de Nemours and Company, Wilmington, DE, containing 10% by weight antimony and prepared by the "conventional" process. This uncalcined powder had a B.E.T. surface area of 141 $m^2/g$ determined as in Example 1. FIG. 1 showed that the commercial powder had very little pore volume in the pore size range between 0.1 and 5 micrometers.

FIG. 2 provides scanning electron micrographs for this commercial powder and the powder of Example 3. FIG. 2a and FIG. 2b are low and high magnification of the commercial powder respectively, and FIG. 2c and FIG. 2d are low and high magnification of the powder of Example 3. A comparison shows that FIG. 2a and FIG. 2b depicted a dense packing of primary particles and a dense microstructure. FIG. 2c and FIG. 2d depicted much larger pore sizes and broader pore distributions.

What is claimed is:

1. An electroconductive powder comprising antimony doped tin oxide containing from about 0.25 to about 20 weight percent antimony and having a pore volume of at least 0.005 cc/g for mean pore diameter sizes within a range of from about 0.1 to about 8 micrometers.

2. The powder of claim 1 having a pore volume of at least 0.01 cc/g for pore diameter within the mean pore diameter sizes range of from about 0.1 to about 5 micrometers.

3. The powder of claim 1 wherein the dry powder resistivity is a maximum of 100 ohm.cm measured at a pressure of $27.6 \times 10^6$ Pa (4000 psi).

4. The powder of claim 2 wherein the dry powder resistivity is a maximum of 20 ohm.cm measured at a pressure of $27.6 \times 10^6$ Pa (4000 psi).

* * * * *